United States Patent [19]

Kim et al.

[11] 4,324,807

[45] Apr. 13, 1982

[54] SIMULATED ADIPOSE TISSUE

[75] Inventors: Myung K. Kim, Congers; Joaquin C. Lugay, Thornwood, both of N.Y.

[73] Assignee: General Foods Corporation, White Plains, N.Y.

[21] Appl. No.: 755,538

[22] Filed: Dec. 30, 1976

[51] Int. Cl.$^3$ .............................. A23D 5/02; A23J 3/00
[52] U.S. Cl. ..................................... 426/104; 426/574; 426/613; 426/646; 426/656; 426/657; 426/802
[58] Field of Search .................. 426/89, 92, 103, 104, 426/574, 576, 583, 602, 613, 641, 656, 657, 486, 802, 646

[56] References Cited

U.S. PATENT DOCUMENTS

| | | | |
|---|---|---|---|
| 2,440,168 | 4/1948 | Cross | 426/641 X |
| 3,108,873 | 10/1963 | Durst | 426/656 X |
| 3,434,843 | 3/1969 | Durst | 426/602 |
| 3,658,550 | 4/1972 | Hawley | 426/656 X |
| 3,840,677 | 10/1974 | Leidy et al. | 426/104 X |
| 3,851,083 | 11/1974 | Brooking et al. | 426/213 |
| 3,999,474 | 12/1976 | Sienkiewicz et al. | 99/467 |

FOREIGN PATENT DOCUMENTS 881397 11/1961 United Kingdom ................ 426/574

*Primary Examiner*—Esther M. Kepplinger
*Attorney, Agent, or Firm*—Mitchell E. Alter; Daniel J. Donovan; Thomas R. Savoie

[57] ABSTRACT

Disclosed is a simulated adipose tissue which is unusually pleasing in taste and texture and is characterized by a juicy, smooth melting property closely resembling natural fat. The simulated adipose tissue can be employed alone or with any type of meat or meat analog where a degree of fatty tissue is desired, and is most desirably employed in products which are served fried. In a preferred embodiment, a simulated bacon product is prepared containing the simulated adipose tissue and a red meat simulating phase. The simulated adipose tissue has droplets of fat, approximately 10 to 120 microns in diameter, encapsulated within a matrix based on a heat coagulable, preferably proteinaceous, component, and a water-soluble, film-forming component.

3 Claims, No Drawings

SIMULATED ADIPOSE TISSUE

BACKGROUND OF THE INVENTION

The present invention relates to improvements in simulated adipose or fat tissues, products employing these components and processes for preparing them. Although there have been many recent advances in protein technology which have enabled the production of restructured or simulated meat products, there is a current need for a material which can closely simulate natural animal adipose tissue.

In naturally, occurring meats, fat is held in contact with red meat tissue as globules contained within a collagen-based cellular network called adipose tissue. During cooking of the meat, the fat within the adipose tissue is melted and released from the tissue as the cellular structure ruptures. The cooked natural adipose tissue adds a desirable and pleasing juiciness and smoothness to the meat, and the fatty tissue itself will have a melt-in-the-mouth characteristic, which until the present invention, has been exclusively the characteristic of natural fatty tissue.

Due to the high costs associated with the better cuts of meat, there have been many prior art attempts to upgrade less desirable cuts of meat through processing, such as by restructuring. In many of these processes, such as those described in U.S. Pat. Nos. 3,903,315 to Giles et al and 3,904,770 to Hale et al, the meat must be cooked and thus the fat rendered from it prior to restructuring. There is an obvious need in products of this type to restore an adipose tissue component to the meat material after restructuring. Very early attempts to restore adipose tissue did exactly that—they inlaid slabs or slices of fat in the product. Such procedures were, however, costly and demanded a suitable source for fatty material.

In one early attempt to avoid the reliance on natural adipose tissue and yet provide a fat coating to a processed meat product. Eckrich et al in U.S. Pat. No. 2,161,029, disclosed a fat replacement made by homogenizing a mixture of a liquid fat and an aqueous gelatin solution. This material, when cooled, was disclosed to have a consistency approximating that of the white of an egg which has been boiled until it is past the fluid or flowing state. The product becomes flowable on heating to allow application by dipping. In U.S. Pat. No. 2,721,142, Shinn et al also disclosed a procedure for preparing a stable fat containing emulsion for coating meat products. In this case, the stable emulsion contained gelatin and a cellulose gum. The Shinn et al coating, however, like the Eckrich et al material, was not intended to texturally simulate natural adipose tissue but was primarily for the purpose of supplying fat to a fat deficient meat product during cooking and was applied warm by dipping. While these and similar approaches did provide some benefits, the need remained for an adipose tissue simulating material which would provide the attributes of the naturally occurring material.

In addition to work on restructured natural meat as an alternative to high quality fresh meat, there is also an intensive effort being made to develop wholly synthetic meat analogs. There is already an economic incentive for this development, and it is believed in the long term that the solution to the problem of world hunger depends upon man's ability to replace his reliance upon animals as a source of protein, with a direct utilization of the plant protein materials which are inefficiently converted to meat protein by the animals. Accordingly, there has been a major effort in producing meat analogs, and with the exception of a failure to provide a good simulation for fatty tissue, progress towards a true simulation of natural meat has been quite good.

Early meat analog efforts were concerned mainly with simulating the red meat or muscle portion of natural meat and were concerned with only cosmetic similarity as far as the fatty or adipose tissue portion was concerned. For example, in U.S. Pat. No. 3,320,070 to Hartman, there is disclosed a meat-like product consisting essentially of man-made fibers and vegetable protein having zones simulating the appearance of lean portions and natural appearing fat-like portions. The disclosed formation of the fat-appearing portion need not differ from that of the meat portion except through the elimination of red coloring from the white phase portion.

Recently, however, efforts have given attention to both fat and meat portions to provide realistic simulations of their natural counterparts. In U.S. Pat. No. 3,840,677, Leidy et al disclose a simulated, multiphased, meat-like product having distinct regions simulating natural red meat and fat. In one specific embodiment, a bacon analog is disclosed having a fat simulating portion prepared from an aqueous emulsion of fat as the discontinuous phase surrounded by a matrix of heat coagulable protein, containing such proteins as egg albumin, proteinaceous filler materials, soy isolate and other heat settable proteins. Another disclosure of a simulated bacon product is that of Corliss et al, U.S. Pat. No. 3,930,033, which describes a simulated bacon product produced by forming and stacking alternate red and white vegetable protein containing layers to simulate lean meat and fat and then cooking the stacked layers to form a slab. The individual layers are produced from separate aqueous mixtures containing specified amounts of vegetable protein fiber, egg albumin, tapioca starch, water, vegetable oil, vegetable gum such as carageenan, vegetable protein isolate, dextrose, sodium caseinate, colorings, flavors and seasonings. These materials are mixed in an aerating type mixer until the mixture is fully homogenized and a substantial amount of air is entrapped within the maxtrix. This formulation, as with that of Leidy et al, does not provide a juicy, smooth melt-down simulating that of natural bacon fat, but has a more dry and cracker-like texture. The materials of the type disclosed by Corliss et al and Leidy et al, however, make a rather significant improvement over the earlier, purely cosmetic fat-appearing materials.

In another recent attempt to provide a fat containing material for simulating natural adipose tissue in meat or meat analog products, Hawley discloses in U.S. Pat. No. 3,658,550, a fat-containing material based on an insoluble, heat-irreversible alginate gel. The fat containing material is disclosed to respond upon cooking and eating much as does natural adipose tissue. To improve the materials nutrition and browning characteristics, small amounts of protein such as soy, cottonseed, albumin and caseine can be employed. However, while the Hawley material may hold fat and improve the quality of meat or meat-like products having a deficiency of fat and may somewhat visually simulate fat, it lacks the smooth melting and oil release properties of natural adipose tissue.

In some prior art meat analog products, fat was thought necessary as a component, but not necessarily in the form of a distinct adipose tissue phase. Typically, fat was included in these products by simply blending and emulsifying it in the meat forming gel or matrix material. For example, in U.S. Pat. No. 3,108,873 to Durst, a meat-like food product is disclosed to have a "lipophilic fluid" included as a stable dispersion in a film forming composition which may utilize soy protein, wheat protein, wheat germ or egg albumin. Durst also discloses that even hydrophillic colloids such as gelatin, agar, and carboxy-methycellulose have been employed as the film forming composition. Also, in U.S. Pat. No. 3,919,435, Feldbrugge et al disclose a meat analog which contains a vegetable protein gel precursor having incorporated therein a fat or oil entrapped within a thermostable, polymeric carbohydrate gel matrix which may contain proteins such as albumin, casein and whey. By encapsulating the fat in this manner it is protected against emulsification in the gel precursor in the production of a meat analog to result in a juicier product than when the fat is simply admixed without encapsulation. The use of these thermostable gels, however, will leave a dry gritty residue in the mouth if employed in pieces large enough to appear as distinct portions of adipose tissue. Moreover, neither, Durst nor Feldbruggee et al are concerned with or teach a simulated adipose tissue for use as a distinct and separate phase in combination with a meat analog.

Thus, there remains a present need for a simulated adipose tissue which has good nutrition, good cooking properties, a smooth mouthfeel and meltable character upon eating, and also provides a good visual and textural simulation of natural adipose tissue.

SUMMARY OF THE INVENTION

Accordingly, it is an object of the present invention to provide a simulated adipose tissue having good nutrition, realistic visual and textural characteristics, natural fat-like melting properties during both cooking and eating, and provides a natural, smooth, fat-like meltdown and mouthfeel upon eating, the adipose tissue being capable of frying according to procedures normally employed for frying natural pork belly adipose tissue such as is found in bacon.

It is another object of the present invention to provide a cooked simulated adipose tissue having good nutrition, realistic visual and textural properties, and a natural, smooth meltdown and mouthfeel during eating which closely simulates natural adipose tissue.

It is a further object of the present invention to provide a process for preparing a simulated adipose tissue of the type described.

And, it is a yet further object of the present invention to provide a process for preparing the cooked adipose tissue described above.

These and other objects, such as the production of a meat analog containing simulated adipose tissue of the type described, are accomplished according to the present invention which in its broadest aspects comprises a simulated adipose tissue, and the process for preparing it, wherein the simulated adipose tissue comprises: at least a first phase comprised of fat dispersed within a second phase matrix substantially enveloping the dispersed fat, wherein:

the fat in the first phase is separated into globules having an average diameter of from about 10 to about 120 microns; and the second phase matrix is a heat coagulated mixture comprising a heat coagulable, preferably proteinaceous, component, and a water-soluble, film-forming component, the matrix having the ability to hold the fat globules within it after coagulation, and yet due to the presence of the water-soluble, film-forming component will smoothly melt upon eating to provide a realistic fat simulating material.

DETAILED DESCRIPTION OF THE INVENTION

To provide a truly appetizing, commercially-practical meat analog product or a restructured meat product it is necessary to have combined with the red meat portion a portion which simulates not only the appearance, but the texture, cooking and eating properties of natural adipose tissue. The visual appearance of the product is of course important, but cannot by itself satisfy the needs and desires of the lover of meat having a conditioned expectation of the juiciness and fat release normally associated with natural meat products. By virtue of the present invention, a simulated adipose tissue is provided which enables economical, continuous processing of conventional food ingredients to provide a nutritious material which can satisfy this conditioned expectation of juiciness and smoothness in meat products associated with natural products containing adipose tissue.

The present invention makes continuous processing and conventional storage possible through the use of a two-phase simulated adipose tissue system wherein a discontinuous fat phase is maintained at an effective fat cell size in a stabilized matrix which is heat settable and yet responds to cooking and frying by the release of fatty juices and has an extremely smooth, melt-away property in the mouth due to the presence of a water-soluble, film-forming component which provides structural and textural integrity throughout processing and cooking until dissolved upon chewing in the mouth. As will become apparent from this detailed description, the uniquely desirable features of the product and process of this invention are attained by virtue of a necessary structural interrelationship of the fat and matrix phases in combination with a matrix phase formulation having several necessary and distinguishing features.

The juiciness, melt, and mouthfeel of the simulated adipose tissue is critically related, among other things, to the fat content. It is therefore necessary to provide a fat of suitable composition and in suitable physical form such that it contributes to the juiciness of the product without adversely affecting other physical attributes. The fat is preferably one which is liquid at normal room temperatures, or if solid, does not melt at such a high temperature that it causes an undesirable waxy coating of the mouth. The preferred fats are those which melt no higher than about 40° C. More preferably, the fat should melt at a temperature below about 25° C. Typical of the fats which can be employed are rendered animal fats, such as lard, tallow and the like. Preferably, however, the liquid vegetable oils are employed. Exemplary of suitable vegetable oils are coconut oil, cottonseed oil, corn oil, olive oil, etc. This listing of fats is by no means exhaustive, but merely exemplary of materials which may be readily employed by those skilled in the art. The particular fat is limited only to the use of those giving the desired mouthfeel as noted above, which do not adversely affect the other physical characteristics of the simulated adipose tissue. Fats which are normally liquid at ordinary room temperatures (i.e., oils) are preferred because they will not solidify under normal conditions of use and reduce the pleasant oil release desired.

It is an advantage of the present invention, in fact, that liquid oils can be successfully employed without weeping from the matrix. On the other hand, fats having extremely high melting temperatures are not preferred because they tend to adversely affect emulsion stability. Accordingly, while hydrogenated vegetable oils can be employed, they are preferably not employed alone.

Tests have shown that while there is no significant correlation between the concentration of the fat employed and the fat globule size obtained in the product after processing, there is a significant correlation between the concentration of the fat and the viscosity of the combined mixture of fat and aqueous matrix forming materials during processing. This correlation is believed due to the dependence of oil concentration on water level. At fat concentrations above 60% based on total system weight, webby structures may form which interfere with the encapsulation of globules of the fat within the matrix material. The webby structure indicates that the dispersions containing these high levels of fat approached phase inversion during processing. These samples tend to exhibit an open celled structure which is contrary to the substantially closed cell structure which occurs in the desired products produced according to the present invention. Fat contents of as low as about 30% provide good oil release and juiciness in the final product; however, the preferred range of fat contents is from about 40 to about 50% based on the total system weight. These percentages are based on the total weight of the adipose tissue system, including fat and water, prior to any dehydration during subsequent processing. This weight basis is used throughout the following discussion wherever percentages are said to be based on "total system weight".

The ability of the simulated adipose tissue of the present invention to simulate the cooking and textural characteristics of natural fat, as well as its ability to provide a smooth meltdown and mouthfeel upon eating, is due in part to the retention of the fat within the matrix phase in discreet droplets or globules in a manner approximating the storage of fat in natural connective animal tissue. Fat stored in this manner has the ability to slowly flow in minor amounts from within ruptured cell walls during cooking and to be further released in organoleptically pleasing amounts upon masticating. Samples of simulated adipose tissue having average cell or fat globule diameters of from about 10 microns to about 120 microns will show good final product characteristics when the formulation of the matrix material is suitable. Cell sizes preferably will be on the order of from about 20 microns to about 80 microns on the average. The majority, preferably 75% or more of the fat globules, will be within these size ranges in the most acceptable products. Products which are overemulsified, that is, being of the fat globule size normally associated with highly stable emulsions (less than about 2 microns), will not have the proper fat release characteristics upon frying or eating and will result in a dry mouthfeel. On the other hand, products having cell sizes substantially in excess of those set forth herein will cause processing anomalies and release the fat too readily and randomly to provide the consistency in product characteristics essential to obtain a commercially acceptable material.

While it is within the contemplation of the present invention that some additives may be present in the fat phase, such as flavors and the like, the use of emulsifiers is neither thought necessary nor presently preferred. Emulsifiers, unless carefully selected based upon the particular fats, proteins and other materials employed in the product, may tend to cause overemulsification or adverse fat-protein interactions which will not allow the uniform, preferred fat globule formation. It is possible, however, to employ carefully selected emulsifiers to aid in a particular processing scheme employing specific matrix forming materials and still obtain the desired final product characteristics. Therefore, it is within the scope of the present invention to employ emulsifiers so long as they do not adversely affect product quality.

The matrix phase of the simulated adipose tissue system must be capable during mixing of forming a continuous film around the fat globules, must have sufficient stability and structural integrity to maintain the fat therein during processing such as forming and heat setting, must have the ability when subjected to cooking to release a moderate amount of fat from the internal cellular structure while maintaining substantial structural integrity, and must be further capable upon masticating in the mouth of providing a meltdown and smooth mouthfeel reminiscent of natural cooked adipose tissue. Thus, the properties necessary for the matrix material of this invention are to some extent at odds with each other. The cellular wall structure formed by the matrix material must be heat coagulable and have adequate physical strength to withstand processing and cooking, yet it must respond in the mouth to a melting action to release the fat contained within its cell walls. Cellular structures which do not melt away in the manner of natural adipose tissue and release the fat in the mouth only upon excessive mastication or leave a dry, gritty residue, are not within the scope of the present invention. The simulated adipose tissue system of this invention can accomplish these results without a preliminary encapsulation of the fat prior to addition to the matrix material. The fat and matrix materials are in direct contact.

The simulated adipose tissue of the present invention obtains the desired characteristics through the use of at least two components in the matrix phase; one being a heat coagulable component; the second being a water-soluble, film-forming component. The heat coagulable component is preferably proteinaceous and will typically be employed at a dry weight of from about 4% to about 18%, preferably from about 6% to about 14% based on the total system weight. The heat coagulable component will preferably contain at least 3% dry weight, based on the total system weight, of a highly functional protein material such as egg albumen, blood albumin or the like, but may contain amounts of suitable carbohydrates such as starches, dextrins and dextrans; and other suitable proteins such as peanut protein isolate, high quality soy protein, and the like. Each of the protein, starch and other components in the matrix phase has its own distinct functional properties. It is therefore very difficult to predict exact textural properties based simply on a knowledge of the individual component characteristics. It appears that these components behave differently in the presence of each other than they would singly. The matrix system of the present invention, when produced in accordance with the present disclosure and especially in view of the guidance provided by the specific examples will, however, enable those skilled in the art to practice the present invention.

Egg albumen is an extremely good film-forming material having high functionality and good heat coagulation characteristics capable of providing an integral cellular structure in the matrix upon heat setting. Blood albumin is also an extremely good heat coagulable material, and regardless of what other coagulable materials are employed in the matrix phase, it appears to be necessary to have a minimum of egg white or blood albumin or a combination of these two materials at a level of at least 3% based on total system weight to obtain the most preferred results. The blood albumin gives a better water and oil release, smoother mouthfeel and more meaty flavor than does egg white. It appears, however, that blood albumin has a slightly lower water and oil holding capacity in the adipose tissue system. As a consequence, water and oil are not held as well with it as with egg albumen during heat setting.

Various starches can be employed to replace a portion of the highly functional blood albumin or egg albumen. Preferably, the level of replacement should be less than about 50%. The dry weight of these highly functional heat coagulable proteins should not be reduced below 3% of the total system weight for the most preferred results. The egg white or blood albumin cannot be wholly replaced with starch because the low heat setting properties of the starches could not by themselves sustain the structural integrity of the matrix phase. Partial replacement does, however, give acceptable texture, good oil release, smooth mouthfeel, and natural fat-like melt upon mastication. Among these starches are tapioca starch, amioca starch, potatoe starch, high amylose starch, and the like. Among these starches, high amylose starch gives a more rough and chalky mouthfeel than does tapioca starch which is high in amylopectin. While the use of starches may reduce the cohesiveness of the heat set material, no insurmountable difficulty in slicing the heat set material is experienced.

It is also possible to employ as a part of the heat coagulable component any other materials, either proteinaceous or non-proteinaceous, which will set up under heat to provide some structural integrity to the matrix phase. The proportions of these materials should, however, be limited, by knowledge of their properties and experience in particular formulations, to those levels which do not adversely affect the unusually good mouthfeel and melting characteristics of the adipose tissue of this invention which distinguish it from prior art products.

To obtain these highly desirable properties of smooth mouthfeel with a realistic smooth meltdown in the mouth upon chewing, the matrix phase of the present invention necessarily includes a water-soluble, film-forming component in addition to the heat coagulable component. The preferred water-soluble, film-forming materials are those which form gels which are heat reversible and melt at elevated temperatures. The materials having this property are preferably employed in the composition at a dry weight of at least 2% based on the total system weight. These water-soluble, film-forming components provide a degree of structural integrity and globule separation potential during processing due to the film-forming characteristics they possess. Importantly, however, these materials, when present in the final product, are soluble and meltable upon contact with water to the extent that they are dissolved or at least create a wetting and sliminess of the residue of the adipose tissue remaining after chewing such that this residue will present a similar melt-in-the-mouth impression as is conveyed by natural adipose tissue. Products prepared without this water-soluble, film-forming component leave a dry, gritty residue in the mouth which is wholly uncharacteristic of natural fatty tissue.

Preferred among the materials which can be employed to provide this smooth mouthfeel and melting in the mouth, and yet provide some structural integrity to the matrix phase during processing are gelatin, carrageenan, milk whey protein, water soluble caseinates, are partially gelatinized collagen. The most preferred among these materials is gelatin. Partial replacement of these preferred materials can be accomplished with caseinate hydrolysates, methyl cellulose and hydroxypropyl cellulose.

Gelatin is unusual among proteins owing to the absence of any appreciable internal order, so that in aqueous solutions at sufficiently high temperaturres the peptide chains take up random configurations. Gelatin solutions form gels upon cooling which can be reversed and melted upon heating in contrast to many other proteins. Therefore gelatin by itself cannot be set by heat. However, gelatin does have film forming properties and can be immobilized when employed in combination with certain heat coagulable proteins such as egg albumen or blood albumin. Because the gelatin is water soluble, it provides a smooth mouthfeel and good melt properties reminiscent of real adipose tissue upon chewing. A wide range of bloom values, preferably from about 20 to about 300, and various types including type A, type B, and mixtures of A and B, can be employed in preparing the adipose tissue system. The low bloom gelatins give a more pronounced melting property in cooked samples, as compared to the higher bloom value materials. Also, it has been noticed that the lower bloom value gelatins impart a lower slurry viscosity during processing than is obtained using the higher bloom materials. Partially gelatinized acid conditioned collagen can be employed with or in place of gelatin to provide a more cohesive and chewy characteristic to the end product while still providing the desired mouthfeel and melting characteristics. Of the various gelatin materials, type B gelatins seem to be the best based on their overall properties in the systems tested to date.

Water soluble caseinate salts also have utility in providing the required water-soluble, film-forming properties. The caseinate salts are very soluble in water and have good film forming properties. Preferred caseinate salts are sodium caseinate and potassium caseinate. By themselves, the caseinate salts cannot be heat set; however, they can be immobilized by heat when employed in the presence of heat coagulable proteins such as egg albumen and blood albumin. The incorporation of soluble caseinate salts into the adipose tissue system gives a smooth mouthfeel after cooking such as by frying, especially when employed in combination with gelatin. The most preferred dry weights of gelatin and caseinate salt in the system will range from 1 to 5% for each of these components, with a preferred total amount of the two components ranging from about 2 to about 6% based on total system weight. Most vegetable protein materials such as soy and peanut isolates give a hard and sandy texture after cooking such as by frying when employed in place of the water-soluble, film-forming components at equivalent levels. The roughness or sandiness comes from the lack of moisture or oil release from the particles, and the lack of the melting or at least surface hydration of the protein itself during mastication. It seems that the caseinate salts melt at least partially or superficially in the mouth during the chew, and as a result gives a smooth mouthfeel. Higher levels of caseinate salts tend to result in softer product textures and result in products which, when fried, tend to stick to the teeth during chewing.

Another material which can be employed as the water-soluble, film-forming component, or at least as a portion thereof, is carrageenan. Carrageenan is the gelatinous extract of the seaweed carrageen, *Chondrus crispis* or Irish moss (q.v.). It is a complex carbohydrate made up of galactose, dextrose and levulose residues and small quantities of pentosan or methylpentosan. It is a water-soluble colloid, refined and dried to a free flowing powder. It absorbs water rapidly, dissolves readily in warm water, and gels on cooling. The carrageenan can be employed as the sole water-soluble, film-forming component; however, it is preferably employed as only a partial replacement of the other more desirable materials such as gelatin and caseinate salts.

Another material suitable for forming this meltable, water-soluble, film-forming component is milk whey protein. This material is obtained by a known commercial process which includes removal of minerals and lactose, followed by concentration of the protein by methods such as ultrafiltration. A desirable characteristic of the milk whey protein is its ability to cause browning upon heating during final cooking of the product resulting from the residual reducing sugars present. This provides a built-in cooking indicator in the final product such that the degree of cooking can be determined visually in the same manner that cooking of natural adipose tissue is determined. Thus, by proper selection of milk whey protein or a similar material which browns on cooking, not only is proper functionality achieved, but the product can be brought one step closer to its natural counterpart which it is intended to simulate.

The matrix material must also include a sufficient amount of water to provide adequate processing and final product properties. Specifically, the water must be present at a level, depending upon the particular protein and other matrix forming materials employed, to achieve a satisfactory solution viscosity in the matrix phase during processing to obtain the proper fat globule size and to achieve a degree of stability which will maintain the desired globule size during processing. Moreover, the water must be present in an amount which will adequately hydrate the matrix forming material employed, and also allow proper dispersion and solution of these materials such that upon cooking they will achieve the proper bite resistance and meltability which is necessary for a realistic simulation of natural adipose tissue. It is presently believed that water contents of from 10% to about 50% based on the total system weight can be employed with suitable results depending upon the type and concentration of the other ingredients. Typically, and preferably, the water contents will range from about 15% to about 35% basis the total system weight. Best results to date have been achieved where the fat content in the simulated adipose tissue ranges from about 40% to about 50% based on the total system weight, and the water content is in the range of from about 50% to about 60% based on the weight of the matrix phase alone prior to any dehydration during processing.

Various flavorings, nutritional supplements and colorings can also be included within the simulated adipose tissue of this invention. These additives can be either water-soluble or fat-soluble or can be employed in components which will reside in both of the phases in the final product. Flavoring materials can include various sugars such as sucrose and dextrose, in the form of cane sugar, beet sugar, corn syrup, and brown sugar; salt; black pepper; white pepper; red pepper; natural and artificial bacon and other meat flavors; maple flavoring; smoke; hydrolyzed vegetable protein; monosodium glutamate; coriander; mace; nutmeg; rosemary; sage; sodium inosinate; sodium guanylate; and the like. These optional flavoring and coloring materials can be added in amounts effective to impart the flavor and color desired for the type of simulated adipose tissue desired to be duplicated. Typically, the flavoring materials will be present at a level of less than 20%, preferably from about 10 to about 16%, based on the total wet weight of the adipose tissue formulation prior to heat setting. Parts of this proportion of flavoring materials, it must be recognized, is not flavoring material as such but only dispersants or carriers, such as fats and carbohydrates, for the various flavorings employed. It is necessary therefore to select flavoring materials which do not themselves or by virtue of a carrier, dispersent or diluent with which they are combined, deleteriously affect either the processing or the final product characteristics of the simulated adipose tissue.

The process for preparing the simulated adipose tissue according to the present invention necessarily employs a series of steps and a set of conditions effective to provide fat globules of the desired size and uniformity, and a suitably functional matrix phase, which together will result in an organoleptically pleasing end product having the desired fat simulating properties. Essentially, the process involves, in its broadest aspects, the preparation of a two-phase system having fat globules, having an average diameter ranging from about 10 microns to about 120 microns, uniformily dispersed throughout a matrix phase comprised of an aqueous mixture of a heat coagulable component and a water-soluble, film-forming component; and heating the resulting two-phase system to coagulate the heat coagulable component and thereby stabilize the two phases into a simulated adipose tissue.

In preparing the simulated adipose tissue, the matrix phase is preferably completely mixed prior to addition to and mixing with the fat phase. Typically, the dry ingredients, except for the gelatin, are dry blended to form a uniform mixture prior to the addition of water. Gelatin, if it is employed, is first dissolved in water by warming to a temperature effective to cause complete solution of the gelatin and is then cooled to 40° C. for addition to the dry ingredients to form the complete matrix forming slurry. Where gelatin, or a similar material which dissolves difficulty and non-uniformily is not employed, the water is directly added to the dry ingredients for blending to obtain a uniform mixture in the matrix forming slurry. To this matrix forming slurry, the oil is added slowly while mixing. The mixing is continued only so long as is necessary, and only at a shear intensity sufficient to obtain the preferred cell size.

The fat cell size in the simulated adipose tissues system is dependent upon the viscosity of the matrix forming slurry assuming constant mixing conditions. The fat cell size can be decreased by increasing viscosity and can be increased by decreasing viscosity. It appears that slurries of high viscosity prevent coalescence of fat particles, and fat particles are broken up more readily by high shear during mixing. It appears further that fat cell size can be controlled more easily by formulation modifications than by altering process conditions. Gelatin has a pronounced effect upon slurry viscosity. Tests indicate on the other hand that the concentration of egg white and caseinate do not show a significant effect on final slurry viscosity. And, while the concentration of oil significantly affects final slurry viscosity, there does not seem to be a significant correlation between oil concentration and fat cell size. This is apparently due to dependence of the oil concentration on the water level. At concentrations of oil of above about 60%, undesirable webby structures have been experienced. This structure indicates that the dispersion of fat globules approaches phase inversion, that is, the oil-in-water dispersion approaches the point of inversion to a water-in-oil emulsion. In these samples exact fat cell size measurements are not possible. It has also been noticed that there is some correlation between the water level and fat cell size. This is probably due to the effect of the viscosity as mentioned previously in view of the fact that there was a very significant negative correlation between the water level and viscosity.

Mixing to cause dispersion of the fat within the aqueous matrix forming material is preferably accomplished at near room temperature, with temperatures of from about 20° C. to about 40° C. being preferable. When normally solid fats are employed which crystalize at or slightly below the mixing temperature, caution should be taken to avoid storage or holding of the unheat-set dispersion of oil in matrix former at temperatures below the mixing temperature because the cell structures may break due to fat crystallization at these lower temperatures. However, once the slurry is set by heat, the heat coagulated simulated adipose tissue is very stable. The heat set material can be stored in a freezer or a refrigerator. In fact, the heat set product is freeze thaw stable and can survive repeated cycles of freezing and thawing.

The degree of mixing will also effect the degree of air incorporated into the product. Because air incorporation may cause textural and processing anomalies, it is not desired to have any significant amounts of air incorporated. Accordingly, densities greater than about 0.85, preferably greater than 0.95, and most preferably greater than 1.00, gram per cubic centimeter are preferred. The density becomes especially important in the preparation of layered products where each layer of slurry must support the weight of the next sucessive layer during processing prior to heat setting. Where any appreciable difference in densities occurs, an undesirable, uncontrolled mixing of the layers can occur. Thus, the mixing should not be too vigorous for the reason stated with regard to fat globule size control and also so that air incorporation is maintained at a minimum. As a precaution during processing, the slurry can be subjected to a deaeration procedure prior to final forming and heat setting.

Another important slurry parameter is that of viscosity. The viscosity should be maintained within certain preferred ranges to obtain optimum mixing and forming. Preferably, the viscosity will range from about $1 \times 10^6$ to about $50 \times 10^6$ centipoises as measured by a Brookfield viscometer fitted with a helipath stand and using a T-B spindle at five RPM at 25° C. While it may be possble to employ viscosities outside this preferred range with specific formulations and under specific processing schemes, slurries having viscosities within these ranges have produced the best results to date and should be adaptable to continuous processing without causing difficulties in process control.

Due to the functionalty of the various preferred matrix forming materials, as well as the desired taste to be ultimately achieved in the final product, it is preferred to maintain the slurry pH at a value of from above about 4.5 to below 8.0. Most preferably, the pH of the slurry will fall within the range of from about 5.0 to about 6.0 and thereby closely approximate the pH of natural meaty materials.

After preparation of the slurry containing the aqueous matrix forming materials having the fat dispersed therein, the slurry can be heat set into any desirable form. In certain embodiments it may be desirable to simply layer the material on a supporting surface and subject it to heat for coagulation, the coagulation occurring prior to a subsequent shaping operation such as by cutting. This type of procedure would be preferred where the simulated adipose tissue were to be cut into chunks and then employed as discreet pieces within a matrix of a red phase simulating material such as in a sausage analog of the type described in U.S. Pat. No. 3,922,352 to Tewey et al. Therein is disclosed a sausage analog having at least three distinct phases: a continuous gel phase, a substantially discontinuous fat phase, and a discontinuous chewy proteinaceous phase. The simulated adipose tissue of this invention can be employed in a product of that type as the substantially discontinuous fat phase. In other embodiments, such as in the production of a bacon analog as is described in U.S. Pat. No. 3,840,677 to Leidy et al, or U.S. Ser. No. 395,793, filed Sept. 10, 1973, now U.S. Pat. No. 3,999,474 to Sienkiewicz et al, the white or fat phase prepared in accordance with the present invention can be layered prior to coagulation alternatively with the red or meat phase component of the type described in those patents. In the preparation of bacon analogs in this manner, the total layered product would then be heat set after layering is completed.

Heat setting can be accomplished in any manner using any suitable device for heating the material to an internal temperature of above about 140° F. for a period of time effective to coagulate the matrix forming material. The heat setting should, however, be done under conditions which will not allow excessive drying of the product at this stage in processing. Heat setting chambers of the type disclosed in the above identified Sienkiewicz et al patent will be useful in obtaining proper results. In its simplest form, heat setting can be accomplished by layering the simulated adipose tissue slurry into a pan either with or without added red phase material to obtain a total product thickness of about 1 to 1½ inches and then cooking this material in a steam chamber not substantially above atmospheric pressure for about 45 minutes. The disclosures of the Tewey et al, Sienkiewicz et al and Leidy et al patents are hereby incorporated by reference for their disclosures of the type of products which can include the simulated adipose tissue of this invention, and the process for preparing those specific types of products wherein the fat phases disclosed by those references are replaced by the simulated adipose tissue disclosed herein.

After heat setting, the simulated adipose tissue can be cut or sliced into the desired product shape and can be marketed as is, after cooking or partially cooking or after incorporation into a composite product. In the specific example of a bacon analog product of the type disclosed in the Sienkiewicz et al patent identified above, the processing is carried out exactly as set forth therein as far as the preparation of the meat simulating material and the layering of the meat and fat simulating materials is concerned; however, the simulated adipose tissue information of this invention is substituted for the fat simulating slurry disclosed by Sienkiewicz et al.

After layering and heat setting, the bacon analog product can be sliced and marketed as is, or it can be subjected to varying degrees of frying. The term frying is used in this context mainly because this stage of production approximates the product qualities attained by frying natural bacon. The frying operation employed from the commercial production standpoint, however, need not be frying in the conventional sense of heating the product in hot oil, but includes various heating or cooking operations conducted at elevated temperatures (e.g. from about 300° to 400° F.) which can reduce the product moisture content to the desired degree. The bacon analog can be completely fried, to a moisture content of from about 2 to 8%, preferably 2% to 4%; but, preferably, the product is partially fried to reduce the moisture content to from about 10 to about 25%, most preferably about 20 to 25%. Prior to or after this partial cooking or frying, the product can be sprayed or otherwise coated with oil where it is to be marketed for final preparation by oven baking. However, where the product is to be marketed for preparation by pan frying, the oil treatment is unnecessary because the ultimate consumer will add oil to the frying pan during home preparation. Moreover, as compared to the prior art products, the coating with oil even for oven preparation can be dispensed with if desired due to the desired, limited oil release properties of the simulated adipose tissue of the present invention.

The simulated adipose tissue disclosed herein is not restricted in usage to situations where the final product is fried, but may include usages with meat or meat simulating protein products prepared according to a variety of procedures which are capable of cooking under a number of different conditions. For example, one possible product would be a roast beef or other meat simulating product having textured protein chunks or slices prepared in accordance with the teachings of such patents as Atkinson in U.S. Pat. No. 3,488,770 or Feldbrugge et al in U.S. Pat. No. 3,886,299, or Hayes et al in U.S. Pat. No. 3,886,298. To obtain the composite product, the textured protein pieces could be simply fabricated into a loaf-like portion having the simulated adipose tissue of this invention applied to the pieces as a slurry such that upon heat setting, the simulated adipose tissue would bind the pieces together and form a unitary structure having a marbling characteristic similar to that of a high quality natural meat product. Alternatively, the textured protein pieces produced according to the above referenced patents or other techniques known to the art such as spinning, can be fabricated with chunks of the simulated adipose tissue prepared in accordance with the present invention and held together by a distinct binder medium such as one based upon egg albumen or other gelable protein as is known in the art.

The following examples are presented for the purpose of further illustrating and explaining the present invention and should not be taken as limiting in any regard. Unless otherwise indicated, all parts and percentages are by weight.

EXAMPLE I

A series of simulated adipose tissue products according to this invention were prepared having the formulations indicated in Table I below. In each case, the dry ingredients other than gelatin were blended in a Hobart mixer (5 quart) for 10 minutes at speed 1. In a separate vessel, water and the gelatin were mixed, and the gelatin dissolved by warming to 75° C. followed by cooling to 40° C. To the dissolved aqueous gelatin solution, maple flavor was added and the combined mixture was further mixed for 15 minutes at speed 1 in a 5 quart Hobart mixer. To the resulting solution, the additional dry ingredients were added and mixed for an additional 10 minutes at speed 1 followed by the addition of the bacon flavor which was added and mixed for 10 minutes at speed 2. After complete mixing of this matrix phase, the oil was added slowly while mixing at speed 2 for a total mixing time of 10 minutes. The resulting slurry was transferred to a pan (6 inches × 10 inches × 2 inches) and cooked in a steam chamber at atmospheric pressure for 45 minutes. The samples were cooled to room temperature to allow uniform slicing. The thus heat-set, cooled slab was then sliced with a Hobart meat slicer to a thickness of 1/16 inches and fried in an electric frying pan with 30 milliliters of soy bean oil at 177° C. for from about 3 to 10 minutes to obtain the optimum browning and textural characteristics.

Each of these samples were subjected to expert panal evaluation to judge: (1) the amount of the oil release from the tissue upon eating, and (2) the overall eating characteristics as compared to real bacon. The line captioned "Among Moisture Release" was based on the sensory perception of the property of juiciness or oil release from the product as compared to what would be expected from natural bacon which was assigned a value of 2.0. No moisture release would have a value of 0. The line captioned "Overall" attempted to show the net overall sensory properties of fried bacon fat in comparison to the net overall sensory properties of the test samples. Natural bacon fat would rank 1 and very unsatisfactory products being grossly different than bacon would have a rating of 3.

TABLE I

| Ingredients (%) | Natural Bacon Fat | Sample | | | | | | | | | | |
|---|---|---|---|---|---|---|---|---|---|---|---|---|
| | | 113 | 118 | 168 | 27 | 28 | 109 | 12 | 25 | 105 | 112 | 114 |
| Gelatin - Type B (240 bloom) | | 4 | 2 | 2 | 2 | 2 | 4 | 4 | 4 | 4 | 4 | 4 |
| Egg albumen | | | | | 3 | | | 6 | 6 | | | |
| Sodium caseinate | | | | | 1 | 1 | .5 | .5 | | .5 | .5 | |
| Blood albumin | | 6 | 6 | 6 | | 6 | 6 | | | 6 | 6 | 6 |
| Milk whey | 1 | | | | | | | | | | | |
| Peanut protein | | | | | | | | | | .5 | | 1 |
| Tapioca starch | | | | | 3 | | | | | | | |
| High amylose starch | | | 4 | | | | | .5 | .5 | | | |
| Carrageenan | | | | 2 | 2 | 2 | | | | | | |

TABLE I-continued

| | | | | | | | | | | | |
|---|---|---|---|---|---|---|---|---|---|---|---|
| Methylcellulose | | | | | 1 | | | | | | |
| Hydroxy propyl-cellulose | | | | | | | | 1 | | .5 | |
| Durkex 500 hydrogenated vegetable oil | 44 | 44 | 44 | 44 | 44 | 44 | 44 | 44 | 44 | 44 | 44 |
| *Spices & flavors | 15 | 15 | 15 | 15 | 15 | 15 | 15 | 15 | 15 | 15 | 15 |
| Water | 30 | 30 | 30 | 30 | 30 | 30 | 30 | 30 | 30 | 30 | 30 |
| EVALUATION | | | | | | | | | | | |
| Amount Moisture Release | 2.0 | 1.5 | 1.5 | 2.0 | 1.75 | 1.5 | 2.0 | 1.5 | 1.5 | 1.5 | 1.5 | 1.5 |
| Overall | 1 | 1 | 1 | 1 | 1 | 1 | 1 | 1 | 1 | 1 | 1 | 1 |

*The formulation of the spice and flavor component is as follows:

| | Percent |
|---|---|
| Monosodium glutamate | 0.300 |
| Natural & artificial flavors | 5.253 |
| Sucrose | 3.607 |
| Black pepper | 0.087 |
| Hydrolyzed vegetable protein | 2.021 |
| Sodium chloride | 3.732 |
| | 15.000 |

EXAMPLE II

A bacon analog containing the simulated adipose tissue of the present invention is prepared having the following formulation:

| Ingredients | Red Phase (%) | White Phase (%) |
|---|---|---|
| Water | 45.5 | 23.6 |
| Vegetable Oil | 18.3 | 47.2 |
| Soy Isolates (Promine DS) | 13.7 | — |
| Textured Protein | 4.6 | — |
| Egg Albumen | 7.4 | 12.7 |
| Gelatin | — | 2.0 |
| Whey Protein Concentrates (Enpro) | — | 1.1 |
| Flavor & color | 10.5 | 13.4 |

The red phase, or meat simulating phase was prepared by mixing all dry ingredients in a Hobart 5 quart mixer for ten minutes on speed 1, adding the water at 75° F., and continuing to mix at speed 1 for another 20 minutes, and adding oil and bacon flavor and mixing an additional 15 minutes on speed 1.

The white, or simulated adipose tissue, phase is prepared in accordance with the procedure outlined in Example I.

The two phases were then layered alternatively to form a slab having 40% white phase and 60% red phase to a depth of about 1 inch. This material is then heat set as set forth in Example I.

EXAMPLE III

A further sample of simulated adipose tissue is prepared according to the procedure of Example I, but this time employing the following formulation:

| Ingredient | Percent |
|---|---|
| Gelatin - Type B (240 bloom) | 4.0 |
| Egg Albumen | 6.0 |
| Sodium Caseinate | 1.0 |
| Durkex 500 hydrogenated vegetable oil | 44.0 |
| Water | 30.0 |
| Spices and flavors | 15.0 |

This sample is very similar to natural bacon fat upon frying.

EXAMPLE IV

A salami analog is prepared employing the red phase formulation and process according to Example II and the simulated adipose tissue formulation and process according to Example III.

After heat setting the white phase as in Example it was cut into pieces varying in rough dimension from about ¼ inches to about 1/16 inches and dispersed within the unheat set red phase slurry at a weight ratio of red to white 70:30. The material was then stuffed into a 2 inch sausage casing and heat set as in Example I.

EXAMPLE V

Pieces of beef flank steak, naturally deficient in adipose tissue, are cut into slices about ¼ inch thick diagonally to the alignment of muscle fibers. These pieces are mixed with the simulated adipose tissue formulation of Example III (except for the substitution of a beef flavor for the spice and flavor mix) at a weight ratio of 85 parts beef to 15 parts simulated adipose tissue. The mixture is then layered and pressed into a baking pan sufficiently to remove air pockets. The product is then heated to an internal temperature of 70° C. by microwave oven.

In an alternative procedure, the beef pieces are dusted with dry egg albumin prior to mixing with the simulated adipose tissue system, and the weight ratio is altered to 90 parts beef to 10 parts simulated adipose tissue.

EXAMPLE VI

A simulated steak is prepared from a freeze aligned soy protein product, a simulated bone, and the simulated adipose tissue system of this invention.

To prepare the freeze aligned textured soy protein product having highly-oriented, well-defined fibers, a soy milk is used as a protein source. The soy milk is prepared by soaking 600 grams of soy beans overnight in water, changing the water several times. The soaked beans are then hot ground with boiling water, the water being present at a 10:1 ratio with regard to the soy beans. The resulting slurry is heated to boiling and held there for 15 minutes and filtered through a double layer of cheesecloth. The residue on the cheesecloth is discarded and the level of solids in the supernatant is determined. The pH of the supernatant is then adjusted to 7.5 using 2 N sodium hydroxide, and an antioxidant is added to the supernatant at a level equivalent to 0.02% of the fat content. Because full fat soy beans are employed, the fat content of the supernatant is about ¼ the weight of the solids present. The soy bean milk is then placed in an aluminum pan to a depth of about one inch. The pan is placed on a block of dry ice (−76° C.) which extends across the entire bottom surface of the pan. Unidirectional ice crystals, substantially perpendicular to the bottom of the pan, are generated. The mass is completely frozen in about 30 minutes. The mass is then freeze dried immediately to prevent change of the crystalline formation of the ice crystals. After freeze drying, the fibrous structure is stabilized by heat treating with moist heat at 15 psig for about 10 minutes. The heat set fibrous mass is then rehydrated, flavored and colored by soaking in water containing red dye and beef flavoring for about 20 minutes.

This textured soy protein material is then placed in a pan and suitably arranged with a simulated bone of dried proteinaceous and farinaceous materials (natural bone can also be employed) to simulate the arrangement found in a porterhouse steak. The voids between the pieces and the perimeter of the assembly are then filled with the simulated adipose tissue formation of Example V and heat set as in Example V.

The above description is intended to enable those skilled in the art to practice the present invention and does not attempt to describe in detail all those modifications and variations of the present invention which will become apparent to those skilled in the art upon reading this disclosure. It is intended, however, that all such obvious modifications and variations be included within the scope of the present invention which is defined by the following claims.

What is claimed is:

1. A restructured natural meat product comprising natural meat and a simulated adipose tissue which comprises an at least two phase system wherein a 1st phase comprising from 30 to 60% fat is dispersed within a second phase matrix substantially enveloping the dispersed fat, wherein the fat in the first phase is separated into globules having an average diameter of from about 10 to about 120 microns; and the second phase matrix is a coagulated mixture comprising from 4 to 18% based on total system weight of a heat coagulable component and at least 2% based on total system weight of a water soluble, film forming component, the matrix having the ability to hold the fat globules within it, and yet due to the presence of the water soluble, film forming component will smoothly melt upon heating.

2. A meat analog product comprising a simulated lean meat portion and a simulated adipose tissue which comprises an at least two phase system wherein a 1st phase comprising from 30 to 60% fat is dispersed within a second phase matrix substantially enveloping the dispersed fat, wherein the fat in the first phase is separated into globules having an average diameter of from about 10 to about 120 microns; and the second phase matrix is a coagulated mixture comprising from 4 to 18% based on total system weight of a heat coagulable component and at least 2% based on total system weight of a water soluble, film forming component, the matrix having the ability to hold the fat globules within it, and yet due to the presence of the water soluble, film forming component will smoothly melt upon heating.

3. A meat analog product according to claim 2 wherein the simulated meat portion is a coagulated mass comprising egg albumin, soy protein, fat and bacon flavor and texturally and visually simulates natural lean bacon meat when fried.

* * * * *